United States Patent
Su

(10) Patent No.: US 7,649,934 B2
(45) Date of Patent: Jan. 19, 2010

(54) APPARATUS AND METHOD FOR ADAPTIVELY CORRECTING I/Q IMBALANCE

(75) Inventor: Chi-Hsi Su, Hsinchu (TW)

(73) Assignee: Sunplus Technology Co., Ltd., Hsinchu (TW)

(*) Notice: Subject to any disclaimer, the term of this patent is extended or adjusted under 35 U.S.C. 154(b) by 643 days.

(21) Appl. No.: 11/362,075

(22) Filed: Feb. 27, 2006

(65) Prior Publication Data

US 2007/0081614 A1 Apr. 12, 2007

(30) Foreign Application Priority Data

Oct. 12, 2005 (TW) .............................. 94135524 A

(51) Int. Cl.
*H03K 5/159* (2006.01)
*H03H 7/30* (2006.01)
*H03H 7/40* (2006.01)

(52) U.S. Cl. ............... 375/235; 375/260; 375/261; 375/316; 375/324; 375/340

(58) Field of Classification Search .......... 375/235, 375/260, 261, 316, 324, 340
See application file for complete search history.

(56) References Cited

U.S. PATENT DOCUMENTS

| 5,105,195 | A | 4/1992 | Conrad | 342/174 |
| 5,321,726 | A | 6/1994 | Kafadar | 375/79 |
| 5,369,411 | A | 11/1994 | Lisle, Jr. | 342/194 |
| 6,044,112 | A | 3/2000 | Koslov | 375/235 |
| 6,987,815 | B2* | 1/2006 | Denno | 375/316 |
| 7,376,170 | B2* | 5/2008 | Scheck | 375/130 |
| 7,515,650 | B1* | 4/2009 | Warner et al. | 375/302 |

* cited by examiner

*Primary Examiner*—Ted M Wang
(74) *Attorney, Agent, or Firm*—Bacon & Thomas, PLLC

(57) ABSTRACT

An apparatus and method for adaptively correcting I/Q imbalance, which is used in a receiver for correcting a received I/Q imbalanced signal to thus eliminate the I/Q imbalance. First, an interference amount caused by interference from an imbalanced in-phase signal to an imbalanced quadrature-phase signal is computed and accordingly subtracted from the quadrature-phase signal, so that a corrected quadrature-phase signal without phase imbalance is obtained. Next, a power of output in-phase signal, a power of output quadrature-phase signal, and a target are compared to thus determine an in-phase scaling factor and a quadrature-phase scaling factor. Finally, the imbalanced in-phase signal is multiplied by the in-phase scaling factor to thus obtain the output in-phase signal, and the corrected quadrature-phase signal is multiplied by the quadrature-phase scaling factor to thus obtain the output quadrature-phase signal.

10 Claims, 5 Drawing Sheets

APPARATUS AND METHOD FOR ADAPTIVELY CORRECTING I/Q IMBALANCE

BACKGROUND OF THE INVENTION

1. Field of the Invention

The invention relates to the technical field of I/Q imbalance correction and, more particularly, to an apparatus and method for adaptively correcting I/Q imbalance.

2. Description of Related Art

Currently, direct conversion receivers are commonly used in portable wireless communication systems due to the features of lower power consumption and better integration, thereby saving the power and reducing the required size. However, such a receiver structure requires overcoming the influence of I/Q imbalance. As shown in FIG. 1, for in-phase signal (I) and quadrature-phase signal (Q) of a received signal Rx, the I/Q imbalance includes a phase imbalance θ and an amplitude imbalance ε. Accordingly, due to the I/Q imbalance, a phase difference between an imbalanced in-phase signal I' and an imbalanced quadrature-phase signal Q' cannot remain in orthogonal, i.e., at 90-degree phase difference. In addition, the amplitude cannot remains in consistence.

The I/Q imbalance may reduce the performance of system transmission, especially to a high-speed transmission that generally uses a modulation of 16QAM or 64QAM and is more sensitive to the I/Q imbalance. FIGS. 2 and 3 show demodulated constellations of an orthogonal frequency division multiplex (OFDM) system with a modulation of 16QAM that is respectively influenced by a phase imbalance and an amplitude imbalance. As shown in FIGS. 2 and 3, in the OFDM system, the I/Q imbalance will cause an inter-carrier interference, in addition to the rotation and deformation of the constellations. For example, in the European digital television (DVB-T/DVB-H) specification, the bit error rate (BER) of entire system exceeds a standard when the phase imbalance is greater than five degrees and the amplitude imbalance is greater than 1 dB. In addition, the I/Q imbalance can change with the factors of temperature, time and selected frequency band. Therefore, a typical signal calibration for correcting the I/Q imbalance may fail due to a change of the I/Q imbalance.

To overcome this, both U.S. Pat. No. 5,321,726 granted to K. Kafada for a "Calibration of vector demodulator using statistical analysis", and U.S. Pat. No. 5,369,411 granted to T. K. Lisle for an "Imbalance correction of in-phase and quadrature phase return signals" use a set of calibration signals to measure required imbalance values for correction. However, such a calibration cannot provide an in-time correction when the I/Q imbalance changes with temperature, time and selected frequency band. Additionally, U.S. Pat. No. 5,105,195 granted to J. C. Conrad for a "System and method for compensation of in-phase and quadrature phase and gain imbalance" uses a fast Fourier transform (FFT) to convert a signal to frequency domain for a correction of the I/Q imbalance. However, such a method is suitable only for the OFDM system. For a non-OFDM system, an additional FFT circuit is still required. U.S. Pat. No. 6,044,112 granted to J. L. Koslov for a "Method and apparatus for correcting amplitude and phase imbalances in demodulators" can correct the I/Q imbalance in time but is suitable only for a single carrier communication system. Therefore, it is desirable to provide an improved apparatus and method for adaptively correcting I/Q imbalance so as to mitigate and/or obviate the aforementioned problems.

SUMMARY OF THE INVENTION

The object of the invention is to provide an apparatus and method for adaptively correcting I/Q imbalance, which can just-in-time adjust correction parameters when the I/Q imbalance is changed with different temperatures, time and frequency bands, thereby effectively overcoming the I/Q imbalance.

According to one aspect of the invention, an apparatus for adaptively correcting I/Q imbalance is provided, which is used in a receiver for correcting a received I/Q imbalanced signal having an in-phase signal and a quadrature-phase signal, to thus eliminate the I/Q imbalance. The apparatus includes: an in-phase signal interference predicting device, which computes an interference amount caused by interference from an imbalanced in-phase signal to an imbalanced quadrature-phase signal; a summing device, which subtracts the interference amount from the imbalanced quadrature-phase signal to thus obtain a corrected quadrature-phase signal without phase imbalance; a quadrature-phase signal gain adapting device, which compares a power of output in-phase signal, a power of output quadrature-phase signal and a target to accordingly determine an in-phase scaling factor and a quadrature-phase scaling factor; a first multiplying device, which multiplies the imbalanced in-phase signal by the in-phase scaling factor to thus obtain the output in-phase signal; and a second multiplying device, which multiplies the corrected quadrature-phase signal by the quadrature-phase scaling factor to thus obtain the output quadrature-phase signal.

According to another aspect of the invention, a method for adaptively correcting I/Q imbalance is provided, which is used in a receiver for correcting a received I/Q imbalanced signal, including an in-phase signal and a quadrature-phase signal, to thus eliminate the I/Q imbalance. The method includes: an in-phase signal interference predicting step, which computes an interference amount caused by interference from an imbalanced in-phase signal to an imbalanced quadrature-phase signal; a summing step, which subtracts the interference amount from the imbalanced quadrature-phase signal to thus obtain a corrected quadrature-phase signal without phase imbalance; a quadrature-phase signal gain adapting step, which compares a power of output in-phase signal, a power of output quadrature-phase signal and a target to accordingly determine an in-phase scaling factor and a quadrature-phase scaling factor; and a multiplying step, which multiplies the imbalanced in-phase signal by the in-phase scaling factor to thus obtain the output in-phase signal, and multiplies the corrected quadrature-phase signal by the quadrature-phase scaling factor to thus obtain the output quadrature-phase signal.

According to still another aspect of the invention, an apparatus for adaptively correcting I/Q imbalance is provided, which is used in a receiver for correcting a received I/Q imbalance signal, including an in-phase signal and a quadrature-phase signal, to thus eliminate the I/Q imbalance. The apparatus includes: a quadrature-phase signal interference predicting device, which computes an interference amount caused by interference from an imbalanced quadrature-phase signal to an imbalanced in-phase signal; a summing device, which subtracts the interference amount from the imbalanced in-phase signal to thus obtain a corrected in-phase signal without phase imbalance; an in-phase signal gain adapting device, which compares a power of output quadrature-phase signal, a power of output in-phase signal and a target to accordingly determine a quadrature-phase scaling factor and an in-phase scaling factor; a first multiplying device, which multiplies the imbalanced quadrature-phase signal by the quadrature-phase scaling factor to thus obtain the output quadrature-phase signal; and a second multiplying device, which multiplies the corrected in-phase signal by the in-phase scaling factor to thus obtain the output in-phase signal.

According to further another aspect of the invention, a method for adaptively correcting I/Q imbalance is provided, which is used in a receiver for correcting a received I/Q imbalance signal, including an in-phase signal and a quadrature-phase signal, to thus eliminate the I/Q imbalance. The apparatus includes: a quadrature-phase signal interference predicting step, which computes an interference amount caused by interference from an imbalanced quadrature-phase signal to an imbalanced in-phase signal; a summing step, which subtracts the interference amount from the imbalanced in-phase signal to thus obtain a corrected in-phase signal without phase imbalance; an in-phase signal gain adapting step, which compares a power of output quadrature-phase signal, a power of output in-phase signal and a target to accordingly determine a quadrature-phase scaling factor and an in-phase scaling factor; and a multiplying step, which multiplies the imbalanced quadrature-phase signal by the quadrature-phase scaling factor to thus obtain the output quadrature-phase signal, and multiplies the corrected in-phase signal by the in-phase scaling factor to thus obtain the output in-phase signal.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
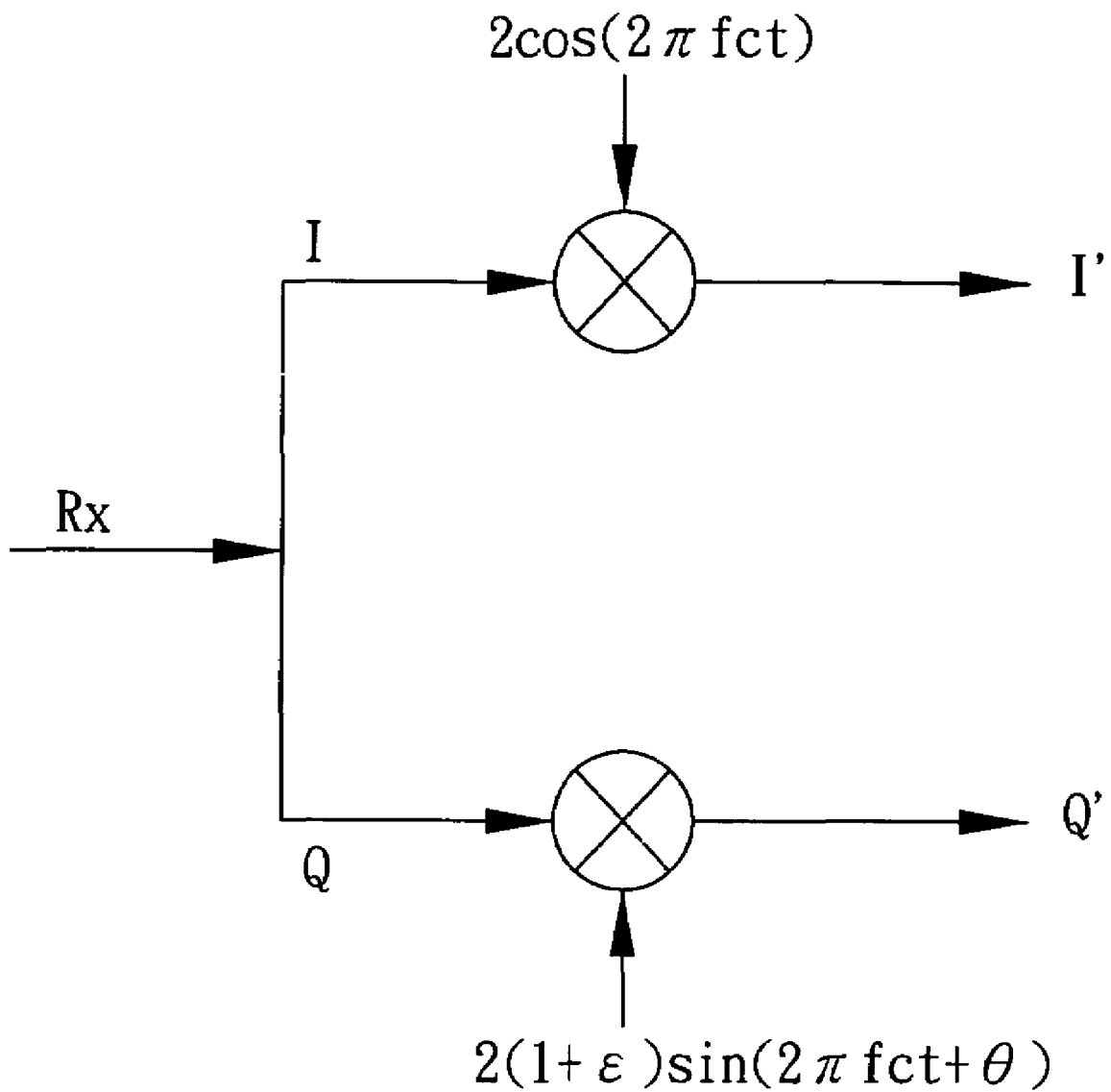
FIG. 1 is a diagram of typical I/Q imbalance of a signal received by a receiver.
Figure 2:
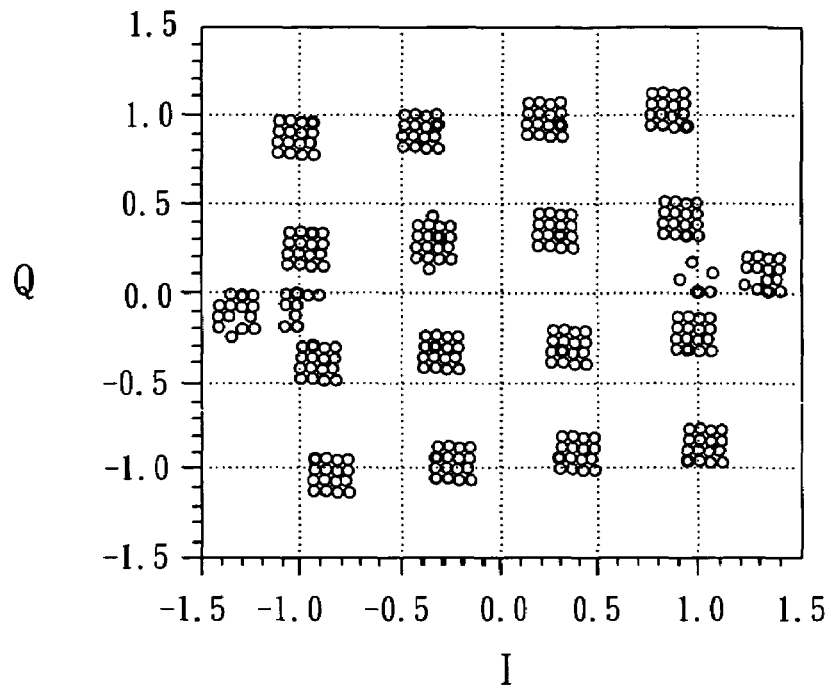
FIG. 2 is a demodulated constellation of an orthogonal frequency division multiplex (OFDM) system with a modulation of 16QAM that is influenced by a phase imbalance.
Figure 3:
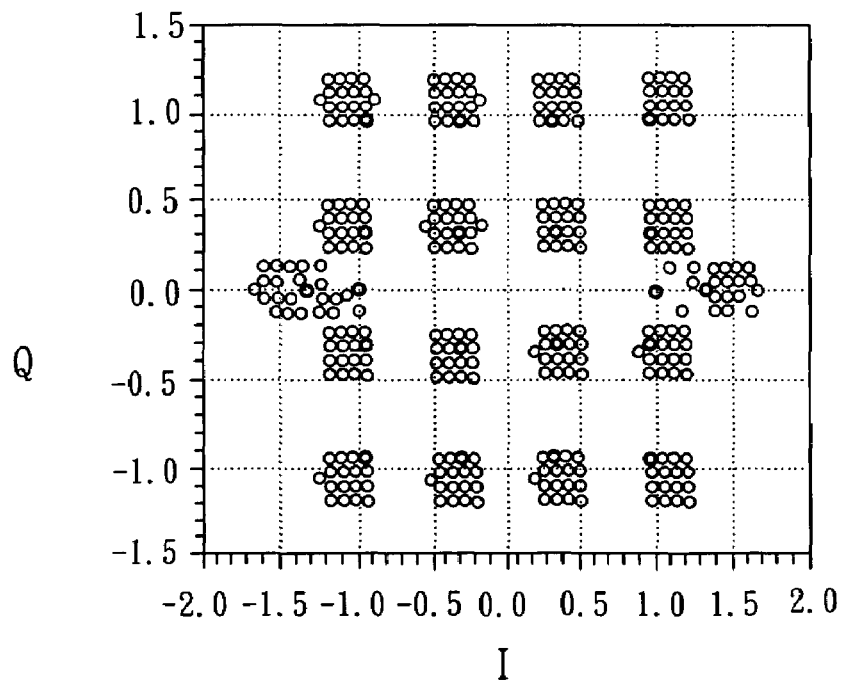
FIG. 3 is a demodulated constellation of an OFDM system with a modulation of 16QAM that is influenced by an amplitude imbalance.
Figure 4:
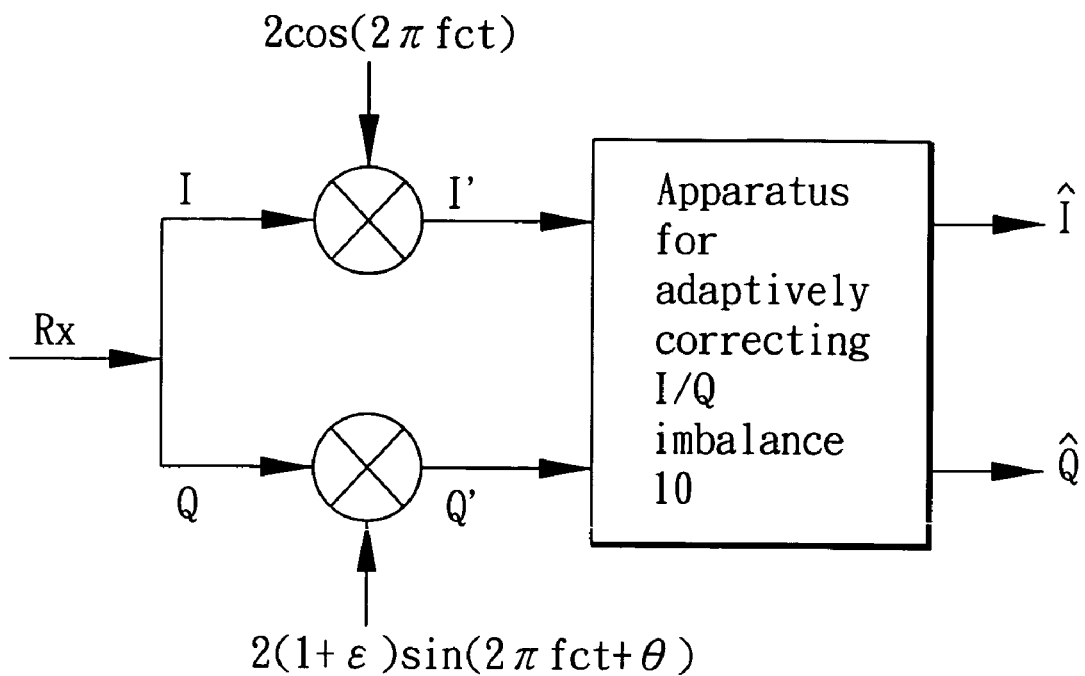
FIG. 4 is a diagram of using an apparatus for adaptively correcting I/Q imbalance to correct an imbalanced signal and thus eliminate the I/Q imbalance according to a first embodiment of the invention.

FIG. 4 shows an embodiment of an apparatus 10 for adaptively correcting I/Q imbalance, which corrects an imbalanced signal and thus eliminate the I/Q imbalance. As shown in FIG. 4, I and Q indicate the received in-phase signal and quadrature-phase signal, respectively, and I' and Q' indicate the imbalanced in-phase signal and imbalanced quadrature-phase signal, respectively. Thus, the received signal Rx can be represented by equation (1) as follows:

$$Rx = I + jQ, \quad (1)$$

and the imbalanced signal Rx' can be represented by equation (2) as follows:

$$Rx' = I' + jQ'. \quad (2)$$

When the received in-phase signal is assumed to be the same with the imbalanced in-phase signal, the imbalanced signals can further be represented as $$I' = I, \quad (3)$$

$$Q' = (1+\epsilon)[\cos(\theta)Q - \sin(\theta)I]. \quad (4)$$

According to equation (4), it is known that the orthogonal feature of I' and Q' is lost due to the term "$-\sin(\theta)I$" to thus result in a phase imbalance, and similarly the term "$(1+\epsilon)\cos(\theta)$" results in an amplitude imbalance. Accordingly, when the term "$-\sin(\theta)I$" is eliminated, we have $Q'=(1+\epsilon)[\cos(\theta)Q]$. Due to a 90-degree phase difference between I and Q, the orthogonal feature of I' and Q' lost is corrected to thus obtain again. Next, an auto gain control is applied to correct the amplitude imbalance using the amplitude of I' or a reference as a target.

Figure 5:
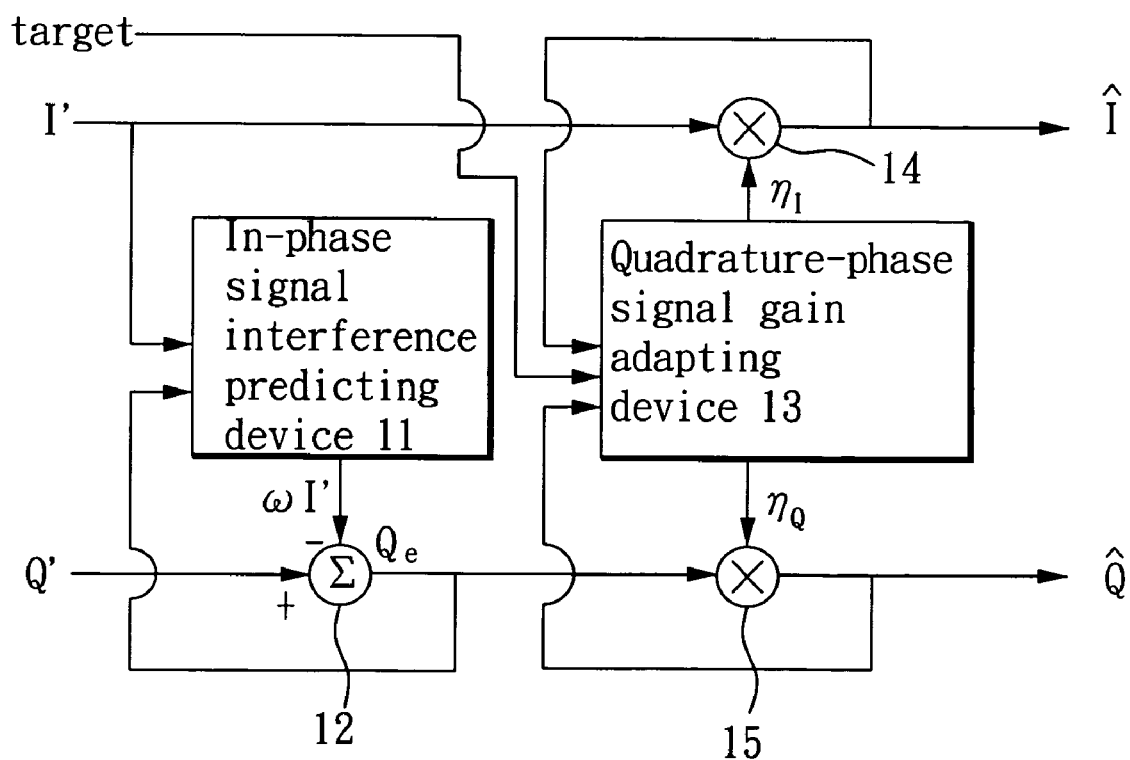
FIG. 5 is a schematic diagram of using an apparatus for adaptively correcting I/Q imbalance according to a first embodiment of the invention.

The cited phase and amplitude imbalances are shown in FIG. 5. Referring to FIG. 5, the apparatus 10 for adaptively correcting I/Q imbalance according to the invention uses an in-phase signal interference predicting device 11 and a summing device 12 to perform multiple corrections in order to correct the phase imbalance; and a quadrature-phase signal gain adapting device 13 and two multiplying devices 14, 15 to perform multiple corrections in order to correct the amplitude imbalance.

According to the aforementioned analysis, it is known that the loss of orthogonal feature between I' and Q' is caused by the term "$-\sin(\theta)I$", and thus the Q' phase imbalance is considered to be caused by interference from I' to Q'. Accordingly, the in-phase signal interference predicting device 11 computes an interference amount $\omega I'$ caused by interference from the imbalanced in-phase signal I' to the imbalanced quadrature-phase signal Q', where $\omega$ is an in-phase interference weight that indicates a quantity of interference caused from I' to Q'. The summing device 12 subsequently subtracts the interference amount $\omega I'$ from the imbalanced quadrature-phase signal Q' to thus obtain a corrected quadrature-phase signal $Q_e = Q' - \omega I'$ without phase imbalance.

In addition, since the amplitude imbalance of I' and Q' is caused by the term "$(1+\epsilon)\cos(\theta)$", the influence of the amplitude imbalance can be eliminated once the last output in-phase and quadrature-phase signals $\hat{I}$ and $\hat{Q}$ are adjusted to have the same power. Accordingly, the quadrature-phase signal gain adapting device 13 compares the power of the last output in-phase signal $\hat{I}$, the power of the last output quadrature-phase signal $\hat{Q}$, and a target to thus determine an in-phase scaling factor $\eta_I$ and a quadrature-phase scaling factor $\eta_Q$, where $\eta_I$ is used to correct the power of the signal $\hat{I}$ in order to meet with the target and $\eta_Q$ is used to correct the power of the signal $\hat{Q}$ in order to meet with the power of the signal $\hat{I}$ or the target. The multiplying device 14 multiplies the signal I' by the in-phase scaling factor $\eta_I$ to thus obtain the output in-phase signal $\hat{I}$. The multiplying device 15 multiplies the corrected quadrature-phase signal $Q_e$ by the quadrature-phase scaling factor $\eta_Q$ to thus obtain the output quadrature-phase signal $\hat{Q}$. Thus, the output in-phase signal $\hat{I}=\eta_I I'$ and the output quadrature-phase signal $\hat{Q}=\eta_Q Q_e$ are obtained without amplitude imbalance.

The cited phase and amplitude imbalances are adaptively corrected one-by-one. For convenient illustration, the following description uses k to indicate a correction number, $I'_k$ and $Q'_k$ to indicate k-th imbalanced in-phase and quadrature-phase signals respectively, $\hat{I}_k$ and $\hat{Q}_k$ to indicate k-th output in-phase and quadrature-phase signals respectively, $\omega_k$ to indicate k-th in-phase interference weight, $Q_{e,k}$ to indicate k-th corrected quadrature-phase signal, $\eta_{I,k}$ and $\eta_{Q,k}$ to indicate k-th in-phase and quadrature-phase scaling factors. Such an adaptive correction (as shown in equation (5)) takes the weight $\omega_k$ closer to the optimal value as increasing the corrected number. At this point, the part of phase imbalance is eliminated to thus obtain the corrected signal $Q_e$ that the phase imbalance of the signal Q' is eliminated.

$$Q'_k - \omega_k I'_k = Q_{e,k}. \tag{5}$$

The in-phase interference weight $\omega_k$ is determined by Newton's method (as shown in equation (6)). Using Newton's method requires measuring an auto-correction of signals (equations (7) and (8)), and thus an iterative approach (equations (9) and (10)) is applied to reduce required memory for estimating the auto-correction.

$$\omega_{k+1} = \omega_k + 2\mu R_k^{-1} Q_{e,k} I'_k, \text{ where } \mu \text{ is a constant,} \tag{6}$$

$$R_k = E[I'_k I'_k], \tag{7}$$

$$\hat{R}_k = \frac{1}{(k+1)} \sum_{l=0}^{k} I'_l I'_l, \tag{8}$$

$$S_k = \sum_{l=0}^{k} v^{k-l} I'_k I'_k = vS_{k-1} + I'_k I'_k, 0 < v < 1, \tag{9}$$

$$\hat{R}_k = \frac{1-v}{1-v^{k+1}} S_k. \tag{10}$$

The following result is obtained by taking equation (10) into equation (6):

$$\omega_{k+1} = \omega_k + \frac{2\mu(1-v^{k+1})}{1-v} S_k^{-1} Q_{e,k} I'_k, \tag{11}$$

$$\omega_{k+1} \approx \omega_k + \frac{2\mu}{1-v} S_k^{-1} Q_{e,k} I'_k \text{ (when } k \text{ approaches to } \infty). \tag{12}$$

Therefore, as the number of correction is getting larger, it is able to obtain a stable weight $\omega_k$ that is closer to the optimal value.

When the power of the signal $\hat{I}$ is corrected by the factor $\eta_I$ to meet with the target and the power of the signal $\hat{Q}$ is corrected by the factor $\eta_Q$ to meet with the power of the signal $\hat{I}$, $\eta_{I,k}$ and $\eta_{Q,k}$ can be derived from the following equations (13)-(16):

$$\epsilon_{Q,k} = \{PD(\hat{I}_k) - PD(\hat{Q}_k)\}, \tag{13}$$

$$\epsilon_{I,k} = \text{target} - PD(\hat{I}_k), \tag{14}$$

$$\eta_{Q,k+1} = \eta_{Q,k} + \lambda_q \epsilon_{Q,k}, \tag{15}$$

$$\eta_{I,k+1} = \eta_{I,k} + \lambda_i \epsilon_{I,k}, \tag{16}$$

where PD(x) is a power of x, $\lambda_q$ and $\lambda_i$ are weights, $\epsilon_{Q,k}$ is a difference between powers of k-th signals $\hat{Q}_k$ and $\hat{I}_k$, and $\epsilon_{I,k}$ is a difference between the power of the k-th signal $\hat{I}_k$ and a target. Thus, the in-phase scaling factor $\eta_I$ obtained can correct the power of the signal $\hat{I}$ to meet with the target, and the quadrature-phase scaling factor $\eta_Q$ obtained can correct the power of the signal $\hat{Q}$ to meet with the power of the signal $\hat{I}$.

When the quadrature-phase signal gain adapting device 13 is implemented by using the factor $\eta_I$ to correct the power of the signal $\hat{I}$ to meet with the target and the factor $\eta_Q$ to correct the power of the signal $\hat{Q}$ to meet with the target, $\eta_{I,k}$ and $\eta_{Q,k}$ can be derived from the following equations (17)-(20):

$$\epsilon_{I,k} = \text{target} - PD(\hat{I}_k), \tag{17}$$

$$\epsilon_{Q,k} = \text{target} - PD(\hat{Q}_k), \tag{18}$$

$$\eta_{I,k+1} = \eta_{I,k} + \lambda_i \epsilon_{I,k}, \tag{19}$$

$$\eta_{Q,k+1} = \eta_{Q,k} + \lambda_q \epsilon_{Q,k}, \tag{20}$$

where PD(x) is a power of x, $\lambda_q$ and $\lambda_i$ are weights, $\epsilon_{Q,k}$ is a difference between a power of k-th signal $\hat{Q}_k$ and a target, and $\epsilon_{I,k}$ is a difference between a power of k-th signal $\hat{I}_k$ and the target. Thus, the in-phase scaling factor $\eta_I$ obtained can correct the power of the signal $\hat{I}$ to meet with the target, and the quadrature-phase scaling factor $\eta_Q$ obtained can correct the power of the signal $\hat{Q}$ to meet with the target.

Figure 6:
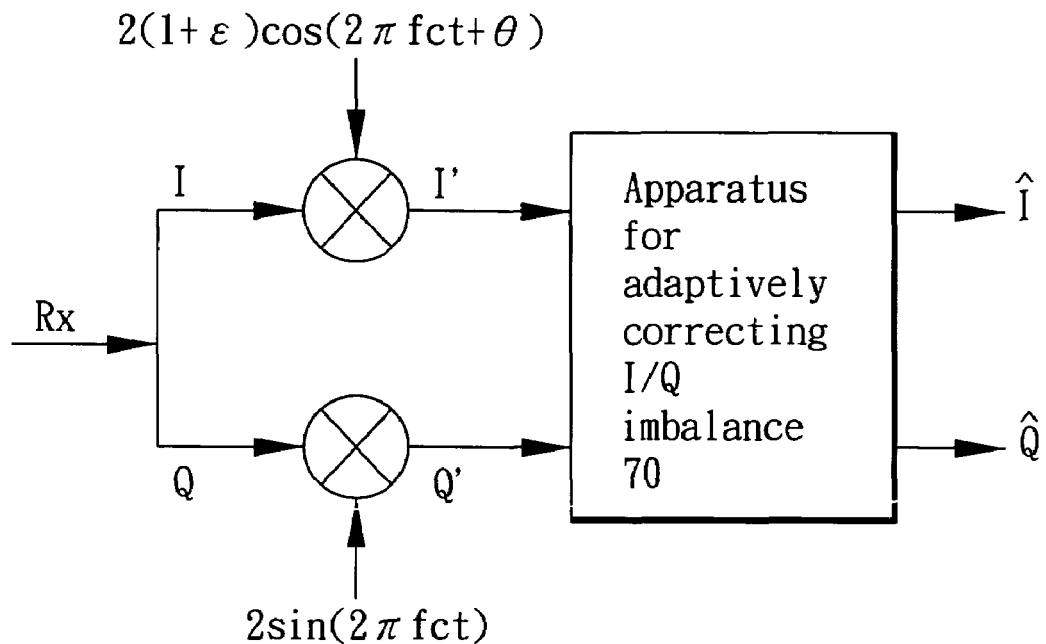
FIG. 6 is a diagram of using an apparatus for adaptively correcting I/Q imbalance to correct an imbalanced signal and thus eliminate the I/Q imbalance according to a second embodiment of the invention.

FIG. 6 is a diagram of an apparatus 70 for adaptively correcting I/Q imbalance according to another embodiment of the invention, in which the received quadrature-phase signal Q is assumed to be the same with the imbalanced quadrature-phase signal Q'. In this case, the imbalanced signals I' and Q' can be represented as follows.

$$Q'=Q, \tag{21}$$

$$I'=(1+\epsilon)[I\cos(\theta)+Q\sin(\theta)] \tag{22}$$

According to equation (22), it is known that the orthogonal feature of I' and Q' is lost due to the term "$-\sin(\theta)I$" to thus result in a phase imbalance, and similarly the term "$(1+\epsilon)\cos(\theta)$" results in an amplitude imbalance. Similarly to the embodiment of FIG. 4, when the term "$Q\sin(\theta)$" is eliminated, the orthogonal feature of I' and Q' lost is corrected to thus obtain again. Next, an auto gain control is applied to correct the amplitude imbalance using the amplitude of Q' or a reference as a target.

Figure 7:
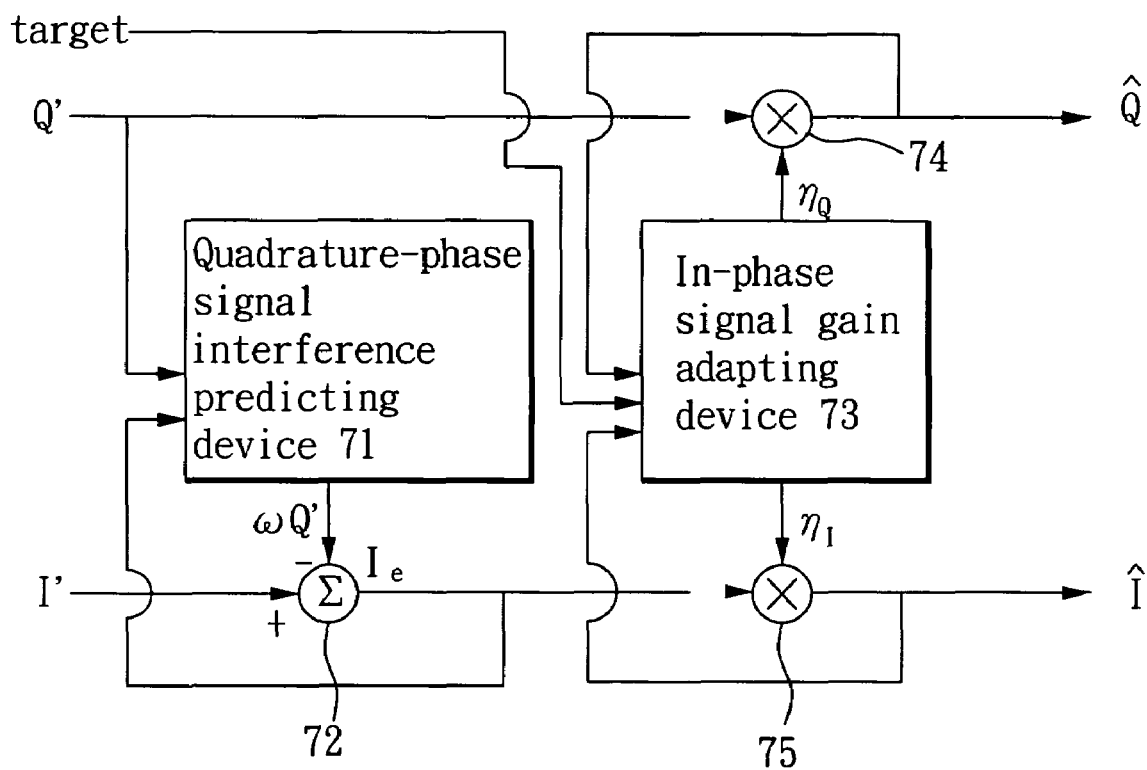
FIG. 7 is a schematic diagram of using an apparatus for adaptively correcting I/Q imbalance according to a second embodiment of the invention.

Referring to FIG. 7, the apparatus 70 for adaptively correcting I/Q imbalance in this embodiment uses a quadrature-phase signal interference predicting device 71 and a summing device 72 to perform multiple corrections in order to correct the phase imbalance; and an in-phase signal gain adapting device 73 and two multiplying devices 74, 75 to perform multiple corrections in order to correct the amplitude imbalance.

The quadrature-phase signal interference predicting device 71 computes an interference amount $\omega Q'$ caused by interference from Q' to I', where $\omega$ is a quadrature-phase interference weight that indicates a quantity of interference caused from Q' to I'. The summing device 12 subsequently subtracts the interference amount ωI' from the imbalanced in-phase signal I' to thus obtain a corrected in-phase signal $I_e$=I'−ωQ' without phase imbalance. In addition, in this embodiment, the in-phase signal gain adapting device 73 compares the power of the output quadrature-phase signal $\hat{Q}$, the power of the output in-phase signal $\hat{I}$, and a target to thus determine a quadrature-phase scaling factor $\eta_Q$ and an in-phase scaling factor $\eta_I$. The multiplying device 74 multiplies the signal Q' by the quadrature-phase scaling factor $\eta_Q$ to thus obtain the output quadrature-phase signal $\hat{Q}$. The multiplying device 75 multiplies the corrected in-phase signal $I_e$ by the in-phase scaling factor $\eta_I$ to thus obtain the output in-phase signal $\hat{I}$. Thus, the output in-phase signal $\hat{I}=\eta_I I'$ and the output quadrature-phase signal $\hat{Q}=\eta_Q Q_e$ are obtained without amplitude imbalance.

The cited phase and amplitude imbalances are adaptively corrected one-by-one. For convenient illustration, the following description uses k to indicate a correction number, $I'_k$ and $Q'_k$ to indicate k-th imbalanced in-phase and quadrature-phase signals respectively, $\hat{I}_k$ and $\hat{Q}_k$ to indicate k-th output in-phase and quadrature-phase signals respectively, $\omega_k$ to indicate k-th quadrature-phase interference weight, $I_{e,k}$ to indicate k-th corrected in-phase signal, $\eta_{I,k}$ and $\eta_{Q,k}$ to indicate k-th in-phase and quadrature-phase scaling factors. Similarly to the analysis of the previous embodiment of FIG. 4, the quadrature-phase interference weight ω can be derived from the following equations (23) and (24):

$$\omega_{k+1} \approx \omega_k + \frac{2\mu}{1-v}S_k^{-1}I_{e,k}Q'_k, \quad \text{(when } k \text{ approaches to } \infty\text{)} \quad (23)$$

$$\text{where } S_k = \sum_{l=0}^{k} v^{k-l}Q'_l Q'_l = vS_{k-1} + Q'_k Q'_k, \; 0 < v < 1. \quad (24)$$

Therefore, as the number of correction is getting larger, it is able to obtain a stable weight $\omega_k$ that is closer to the optimal value.

When the in-phase signal gain adapting device 73 is implemented by using the factor $\eta_I$ to correct the power of the signal $\hat{I}$ to meet with the target and the factor $\eta_Q$ to correct the power of the signal $\hat{Q}$ to meet with the power of the signal $\hat{I}$, $\eta_{I,k}$ and $\eta_{Q,k}$ can be derived from the following equations (25)-(28):

$$\epsilon_{I,k}=\{PD(\hat{Q}_k)-PD(\hat{I}_k)\} \quad (25)$$

$$\epsilon_{Q,k}=\text{target}-PD(\hat{Q}_k), \quad (26)$$

$$\eta_{I,k+1}=\eta_{I,k}+\lambda_i\epsilon_{I,k}, \quad (27)$$

$$\eta_{Q,k+1}=\eta_{Q,k}+\lambda_q\epsilon_{Q,k}, \quad (28)$$

where PD(x) is a power of x, $\lambda_q$ and $\lambda_i$ are weights, $\epsilon_{I,k}$ is a difference between powers of k-th signals $\hat{I}_k$ and $\hat{Q}_k$, and $\epsilon_{Q,k}$ is a difference between the power of the k-th signal $\hat{Q}_k$ and a target. Thus, the in-phase scaling factor $\eta_I$ obtained can correct the power of the signal $\hat{I}$ to meet with the target, and the quadrature-phase scaling factor $\eta_Q$ obtained can correct the power of the signal $\hat{Q}$ to meet with the power of the signal $\hat{I}$.

When the in-phase signal gain adapting device 73 is implemented by using the factor $\eta_I$ to correct the power of the signal $\hat{I}$ to meet with the target and the factor $\eta_Q$ to correct the power of the signal $\hat{Q}$ to meet with the target, $\eta_{I,k}$ and $\eta_{Q,k}$ can be derived from the following equations (29)-(32):

$$\epsilon_{Q,k}=\text{target}-PD(\hat{Q}_k), \quad (29)$$

$$\epsilon_{I,k}=\text{target}-PD(\hat{I}_k), \quad (30)$$

$$\eta_{Q,k+1}=\eta_{Q,k}+\lambda_q\epsilon_{Q,k}, \quad (31)$$

$$\eta_{I,k+1}=\eta_{I,k}+\lambda_i\epsilon_{I,k}, \quad (32)$$

where PD(x) is a power of x, $\lambda_q$ and $\lambda_i$ are weights, $\epsilon_{I,k}$ is a difference between a power of k-th signal $\hat{I}_k$ and the target, and $\epsilon_{Q,k}$ is a difference between a power of k-th signal $\hat{Q}_k$ and a target. Thus, the quadrature-phase scaling factor $\eta_Q$ obtained can correct the power of the signal $\hat{Q}$ to meet with the target, and the in-phase scaling factor $\eta_I$ obtained can correct the power of the signal $\hat{I}$ to meet with the target.

Figure 8:
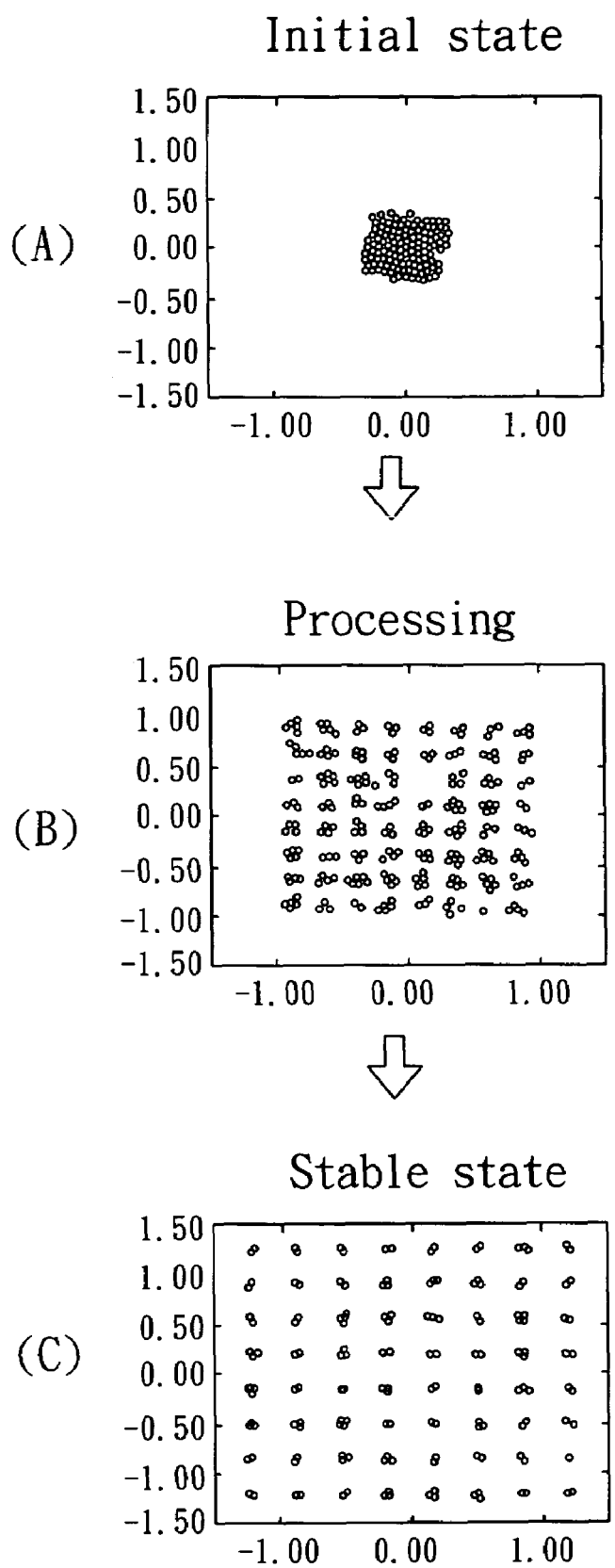
FIG. 8 is a flowchart of using an apparatus for adaptively correcting I/Q imbalance to perform an adaptive correction, with conditions of 64QAM, 30-degree phase imbalance and 50 dB amplitude imbalance, to thus complete the correction and eliminate the imbalance.

In order to verify the effect of the invention, FIG. 8 shows a process of using the present apparatus for adaptively correcting I/Q imbalance to perform an adaptive correction (with $\mu$=0.1, $\lambda_q=\lambda_i=10^{-3}$, target=0.014) (B), under conditions of 64QAM, 30-degree phase imbalance and 50 dB amplitude imbalance (A), to thus complete the correction and eliminate the imbalances (C).

Although the present invention has been explained in relation to its preferred embodiment, it is to be understood that many other possible modifications and variations can be made without departing from the spirit and scope of the invention as hereinafter claimed.

What is claimed is:

1. An apparatus for adaptively correcting I/Q imbalance, which is used in a receiver for correcting a received I/Q imbalanced signal having an in-phase signal and a quadrature-phase signal, to thus eliminate the I/Q imbalance, the apparatus comprising:
   an in-phase signal interference predicting device, which computes an interference amount caused by interference from an imbalanced in-phase signal to an imbalanced quadrature-phase signal;
   a summing device, which subtracts the interference amount from the imbalanced quadrature-phase signal to thus obtain a corrected quadrature-phase signal without phase imbalance;
   a quadrature-phase signal gain adapting device, which compares a power of output in-phase signal, a power of output quadrature-phase signal, and a target to accordingly determine an in-phase scaling factor and a quadrature-phase scaling factor;
   a first multiplying device, which multiplies the imbalanced in-phase signal by the in-phase scaling factor to thus obtain the output in-phase signal; and
   a second multiplying, which multiplies the corrected quadrature-phase signal by the quadrature-phase scaling factor to thus obtain the output quadrature-phase signal.

2. The apparatus as claimed in claim 1, wherein the interference amount computed by the in-phase signal interference predicting device is ωI', where I' is the imbalanced in-phase signal and ω is an in-phase interference weight.

3. The apparatus as claimed in claim 2, wherein the in-phase interference weight ω is derived from:

$$\omega_{k+1} = \omega_k + \frac{2\mu}{1-v}S_k^{-1}I_{e,k}Q'_k,$$

where k indicates a correction number, μ is a constant, $I'_k$ indicates a k-th imbalanced in-phase, $Q_{e,k}$ indicates a k-th corrected quadrature-phase signal, and $$S_k = \sum_{l=0}^{k} v^{k-1} Q'_k Q'_k = vS_{k-1} + Q'_k Q'_k, 0 < v < 1.$$

4. The apparatus as claimed in claim 2, wherein the in-phase scaling factor $\eta_I$ and the quadrature-phase scaling factor $\eta_Q$ are derived respectively from:

$\epsilon_{Q,k} = \{PD(\hat{I}_k) - PD(\hat{Q}_k)\}$, $\epsilon_{I,k} = \text{target} - PD(\hat{I}_k)$, $\eta_{Q,k+1} = \eta_{Q,k} + \lambda_q \epsilon_{Q,k}$, and $\eta_{I,k+1} = \eta_{I,k} + \lambda_i \epsilon_{I,k}$, where k indicates a correction number, PD(x) indicates a power of x, $\lambda_q$ and $\lambda_i$ indicate weights, $\hat{I}_k$ indicates a k-th output in-phase signal, $\hat{Q}_k$ indicates a k-th output quadrature-phase signal, $\epsilon_{Q,k}$ is a difference between powers of the k-th signals $\hat{Q}_k$ and $\hat{I}_k$, and $\epsilon_{I,k}$ is a difference between the power of the k-th signal $\hat{I}_k$ and the target.

5. The apparatus as claimed in claim 2, wherein the in-phase scaling factor $\eta_I$ and the quadrature-phase scaling factor $\eta_Q$ are derived respectively from:

$\epsilon_{I,k} = \text{target} - PD(\hat{I}_k)$, $\epsilon_{Q,k} = \text{target} - PD(\hat{Q}_k)$, $\eta_{I,k+1} = \eta_{I,k} + \lambda_i \epsilon_{I,k}$, and $\eta_{Q,k+1} = \eta_{Q,k} + \lambda_q \epsilon_{Q,k}$, where k indicates a correction number, PD(x) indicates a power of x, $\lambda_q$ and $\lambda_i$ indicate weights, $\hat{I}_k$ indicates a k-th output in-phase signal, $\hat{Q}_k$ indicates a k-th output quadrature-phase signal, $\epsilon_{Q,k}$ is a difference between a power of the k-th signals $\hat{Q}_k$ and the target, and $\epsilon_{I,k}$ is a difference between a power of the k-th signal $\hat{I}_k$ and the target.

6. A method for adaptively correcting I/Q imbalance, which is used in a receiver including an in-phase signal interference predicting device, a summing device, a quadrature-phase signal gain adapting device, a first multiplying device and a second multiplying device for correcting a received I/Q imbalanced signal having an in-phase signal and a quadrature-phase signal, to thus eliminate the I/Q imbalance, the method comprising:

an in-phase signal interference predicting step, which is executed by the in-phase signal interference predicting device to compute an interference amount caused by interference from an imbalanced in-phase signal to an imbalanced quadrature-phase signal;

a summing step, which is executed by the summing device to subtract the interference amount from the imbalanced quadrature-phase signal to thus obtain a corrected quadrature-phase signal without phase imbalance;

a quadrature-phase signal gain adapting step, which is executed by the quadrature-phase signal gain adapting device to compare a power of output in-phase signal, a power of output quadrature-phase signal, and a target to accordingly determine a quadrature-phase scaling factor and an in-phase scaling factor; and a multiplying step, which is executed by the first multiplying device to multiply the imbalanced in-phase signal by the in-phase scaling factor to thus obtain the output in-phase signal, and is executed by the second multiplying device to multiply the corrected quadrature-phase signal by the quadrature-phase scaling factor to thus obtain the output quadrature-phase signal.

7. The method as claimed in claim 6, wherein the interference amount computed by the in-phase signal interference predicting device is notated by ωI', where I' is the imbalanced in-phase signal and ω is an in-phase interference weight.

8. The method as claimed in claim 7, wherein the in-phase interference weight ω is derived from:

$$\omega_{k+1} \approx \omega_k + \frac{2\mu}{1-v} S_k^{-1} I_{e,k} Q'_k,$$

where k indicates a correction number, μ is a constant, $I'_k$ indicates a k-th imbalanced in-phase signal, $Q_{e,k}$ indicates a k-th corrected quadrature-phase signal, and $$S_k = \sum_{l=0}^{k} v^{k-1} Q'_k Q'_k = vS_{k-1} + Q'_k Q'_k, 0 < v < 1.$$

9. The method as claimed in claim 7, wherein the in-phase scaling factor $\eta_I$ and the quadrature-phase scaling factor $\eta_Q$ are derived respectively from:

$\epsilon_{Q,k} = \{PD(\hat{I}_k) - PD(\hat{Q}_k)\}$, $\epsilon_{I,k} = \text{target} - PD(\hat{I}_k)$, $\eta_{Q,k+1} = \eta_{Q,k} + \lambda_q \epsilon_{Q,k}$, and $\eta_{I,k+1} = \eta_{I,k} + \lambda_i \epsilon_{I,k}$, where k indicates a correction number, PD(x) indicates a power of x, $\lambda_q$ and $\lambda_i$ indicate weights, $\hat{I}_k$ indicates a k-th output in-phase signal, $\hat{Q}_k$ indicates a k-th output quadrature-phase signal, $\epsilon_{Q,k}$ is a difference between powers of the k-th signals $\hat{Q}_k$ and $\hat{I}_k$, and $\epsilon_{I,k}$ is a difference between the power of the k-th signal $\hat{I}_k$ and the target.

10. The method as claimed in claim 7, wherein the in-phase scaling factor $\eta_I$ and the quadrature-phase scaling factor $\eta_Q$ are derived respectively from:

$\epsilon_{I,k} = \text{target} - PD(\hat{I}_k)$, $\epsilon_{Q,k} = \text{target} - PD(\hat{Q}_k)$, $\eta_{I,k+1} = \eta_{I,k} + \lambda_i \epsilon_{I,k}$, and $\eta_{Q,k+1} = \eta_{Q,k} + \lambda_q \epsilon_{Q,k}$, where k indicates a correction number, PD(x) indicates a power of x, $\lambda_q$ and $\lambda_i$ indicate weights, $\hat{I}_k$ indicates a k-th output in-phase signal, $\hat{Q}_k$ indicates a k-th output quadrature-phase signal, $\epsilon_{Q,k}$ is a difference between a power of the k-th signals $\hat{Q}_k$ and the target, and $\epsilon_{I,k}$ is a difference between a power of the k-th signal $\hat{I}_k$ and the target.

* * * * *

UNITED STATES PATENT AND TRADEMARK OFFICE
CERTIFICATE OF CORRECTION

| | |
|---|---|
| PATENT NO. | : 7,649,934 B2 |
| APPLICATION NO. | : 11/362075 |
| DATED | : January 19, 2010 |
| INVENTOR(S) | : Chi-Hsi Su |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 969 days.

Signed and Sealed this

Twenty-eighth Day of December, 2010

David J. Kappos
*Director of the United States Patent and Trademark Office*